(12) United States Patent
Chahal et al.

(10) Patent No.: US 11,151,013 B2
(45) Date of Patent: Oct. 19, 2021

(54) SYSTEMS AND METHODS FOR PERFORMANCE EVALUATION OF INPUT/OUTPUT (I/O) INTENSIVE ENTERPRISE APPLICATIONS

(71) Applicant: Tata Consultancy Services Limited, Mumbai (IN)

(72) Inventors: Dheeraj Chahal, Mumbai (IN); Manoj Karunakaran Nambiar, Mumbai (IN)

(73) Assignee: Tate Consultancy Services Limited, Mumbai (IN)

( * ) Notice: Subject to any disclaimer, the term of this patent is extended or adjusted under 35 U.S.C. 154(b) by 762 days.

(21) Appl. No.: 15/882,568

(22) Filed: Jan. 29, 2018

(65) Prior Publication Data

US 2018/0217913 A1    Aug. 2, 2018

(30) Foreign Application Priority Data

Jan. 30, 2017    (IN) .............................. 201721003250

(51) Int. Cl.
*G06F 11/34*    (2006.01)
*G06F 11/30*    (2006.01)

(52) U.S. Cl.
CPC ...... *G06F 11/3457* (2013.01); *G06F 11/3041* (2013.01); *G06F 11/3414* (2013.01); *G06F 11/349* (2013.01); *G06F 11/3428* (2013.01)

(58) Field of Classification Search
CPC ............. G06F 11/3457; G06F 11/3414; G06F 11/3041; G06F 11/3428; G06F 11/349

(Continued)

(56) References Cited

U.S. PATENT DOCUMENTS 6,230,313 B1    5/2001    Callahan, II et al.
6,681,309 B2 *  1/2004    Szendy .............. G06F 11/3466
                                                        711/153

(Continued)

OTHER PUBLICATIONS

Sankar, Sriram, and Kushagra Vaid. "Storage characterization for unstructured data in online services applications." 2009 IEEE International Symposium on Workload Characterization (IISWC). IEEE, 2009. pp. 148-157. (Year: 2009).*

(Continued)

*Primary Examiner* — Kamini S Shah
*Assistant Examiner* — John E Johansen
(74) *Attorney, Agent, or Firm* — Finnegan, Hendersen, Farabow, Garrett & Dunner LLP

(57) ABSTRACT

The present disclosure provides systems and methods for performance evaluation of Input/Output (I/O) intensive enterprise applications. Representative workloads may be generated for enterprise applications using synthetic benchmarks that can be used across multiple platforms with different storage systems. I/O traces are captured for an application of interest at low concurrencies and features that affect performance significantly are extracted, fed to a synthetic benchmark and replayed on a target system thereby accurately creating the same behavior of the application. Statistical methods are used to extrapolate the extract features to predict performance at higher concurrency level without generating traces at those concurrency levels. The method does not require deploying the application or database on the target system since performance of system is dependent on access patterns instead of actual data. Identical access patterns are re-created using only replica of database files of the same size as in the real database.

11 Claims, 10 Drawing Sheets

(58) Field of Classification Search
USPC .......................................................... 703/22
See application file for complete search history.

(56) References Cited

U.S. PATENT DOCUMENTS 8,010,337 B2    8/2011   Narayanan et al.
8,656,407 B2 *  2/2014   Wintergerst ........ G06F 11/3495
                                                     718/106

OTHER PUBLICATIONS

Cook, Jonathan E., and Alexander L. Wolf. "Event-based detection of concurrency." ACM SIGSOFT Software Engineering Notes 23.6 (1998). pp. 1-17. (Year: 1998).*
Zhang, Zhaoning, et al. "VMThunder: fast provisioning of large-scale virtual machine clusters." IEEE Transactions on Parallel and Distributed Systems 25.12 (2014). pp. 3328-3338. (Year: 2014).*
Yao, Zhihao, Ioannis Papapanagiotou, and Rean Griffith. "Serifos: Workload consolidation and load balancing for SSD based cloud storage systems." arXiv preprint arXiv:1512.06432 (2015). pp. 1-12. (Year: 2015).*
Virk, R. et al. "Trace replay based I/O performance studies for enterprise workload migration," *2nd Annual Conference of CMG India*, Nov. 27-28, 2015, Bangalore, IN; 7 pages.
Seltzer, M. et al. "The Case for Application-Specific Benchmarking," *Proceeding HOTOS '99 Proceedings of The Seventh Workshop on Hot Topics in Operating Systems*, Mar. 28-30, 1999, Rio Rico, AZ; 6 pages.
Chahal, D. et al. "Performance Extrapolation of IO Intensive Workloads," *Proceeding ICPE '16 Proceedings of the $7^{th}$ ACM/SPEC on International Conference on Performance Engineering*, Mar. 12-16, 2016, Deft, NE; pp. 105-108.

* cited by examiner

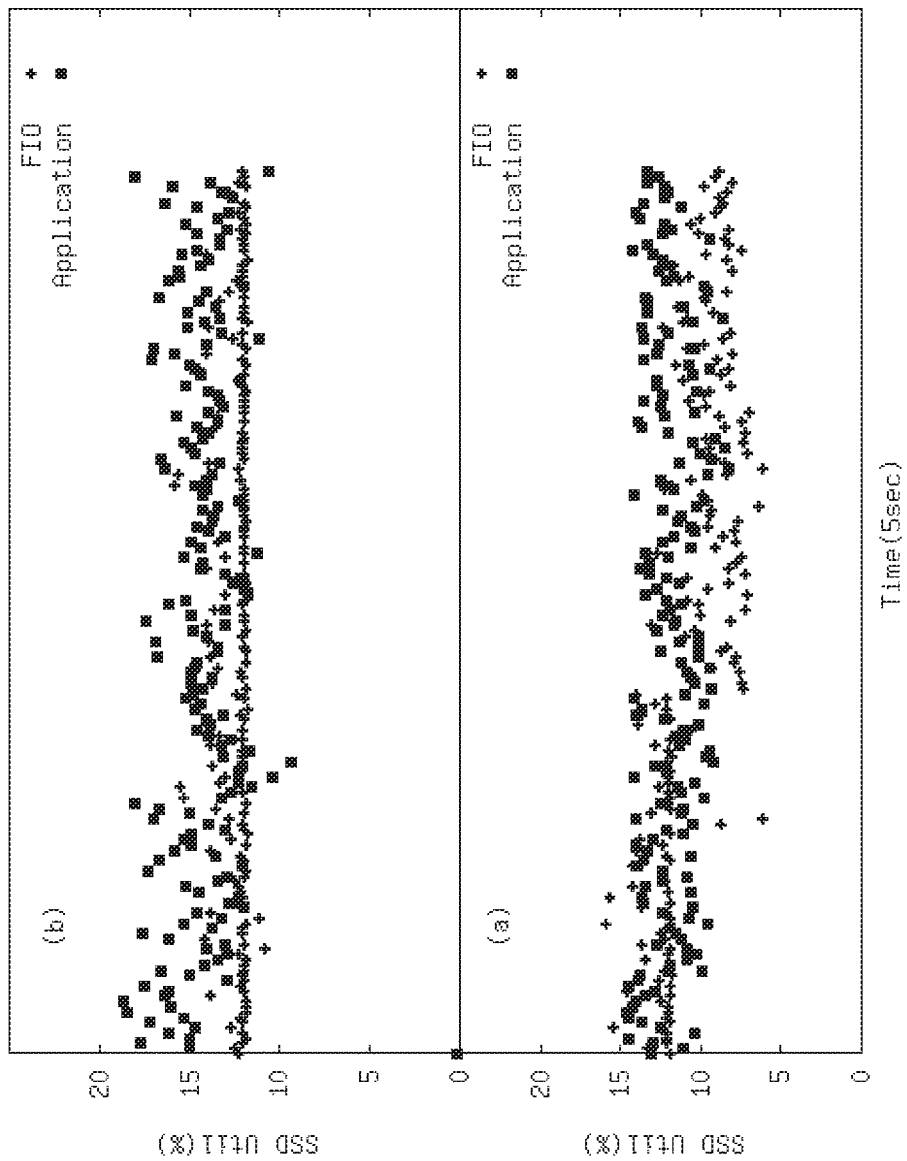

SYSTEMS AND METHODS FOR PERFORMANCE EVALUATION OF INPUT/OUTPUT (I/O) INTENSIVE ENTERPRISE APPLICATIONS

PRIORITY CLAIM

This U.S. patent application claims priority under 35 U.S.C. § 119 to: Indian Patent Application No. 201721003250, filed on 30 Jan. 2017. The entire contents of the aforementioned application are incorporated herein by reference.

TECHNICAL FIELD

The embodiments herein generally relate to performance evaluation of Input/Output (I/O) intensive enterprise applications, and more particularly to predicting performance on different storage systems.

BACKGROUND

Evaluating performance of an application with multiple types of storage systems and varying number of cores is a time consuming and daunting task. It either requires deploying the application and migrating data to each target system or a priori knowledge of the storage system with different concurrency levels (no. of users). Input/Output (I/O) trace replay is one technique that can be used to reproduce the application characteristics on the target system without deploying the application on the target system. However, trace collection tools slow down the application significantly at large workloads resulting in software overhead. Trace collection at large workloads results in time dilation and replaying such traces results in incorrect performance estimation. Moreover, these tools are unable to extrapolate traces for larger concurrencies and accordingly are not advisable for large or high concurrency workloads.

SUMMARY

Embodiments of the present disclosure present technological improvements as solutions to one or more of the above-mentioned technical problems recognized by the inventors in conventional systems.

In an aspect, there is provided a processor implemented method comprising: capturing system call input/output (I/O) trace files on a source system pertaining to an application of interest for at least three base concurrencies; selectively extracting a plurality of temporal and spatial features from the captured trace files; and generating representative workloads for the application of interest deployable across platforms based on the extracted plurality of temporal and spatial features and one or more pre-defined parameters pertaining to the application of interest and the source system.

In another aspect, there is provided a system comprising: one or more processors; and one or more internal data storage devices, operatively coupled to the one or more processors for storing instructions configured for execution by the one or more processors, the instructions being comprised in: an I/O trace collector configured to capture system call input/output (I/O) trace files on a source system pertaining to an application of interest for at least three base concurrencies; a feature extraction engine configured to selectively extract a plurality of temporal and spatial features from the captured trace files; and a workload generator configured to generate representative workloads for the application of interest deployable across platforms based on the extracted plurality of temporal and spatial features and one or more pre-defined parameters pertaining to the application of interest and the source system.

In an embodiment of the present disclosure, the instructions are further comprised in an extrapolator configured to extrapolate the extracted plurality of temporal and spatial features at one or more concurrencies higher than the at least three base concurrencies; and a replay model configured to predict performance of the application of interest across platforms on a target system and at the one or more concurrencies higher than the at least three base concurrencies by replaying the extrapolated plurality of temporal and spatial features on the target system using a synthetic benchmark.

In yet another aspect, there is provided a computer program product comprising a non-transitory computer readable medium having a computer readable program embodied therein, wherein the computer readable program, when executed on a computing device, causes the computing device to: capture system call input/output (I/O) trace files on a source system pertaining to an application of interest for at least three base concurrencies; selectively extract a plurality of temporal and spatial features from the captured trace files; and generate representative workloads for the application of interest deployable across platforms based on the extracted plurality of temporal and spatial features and one or more pre-defined parameters pertaining to the application of interest and the source system.

In an embodiment of the present disclosure, the I/O trace files contain one or more of system calls with thread identifier, timestamp value, size of data read or written, offset address, file descriptor (FD), bytes returned, offset address, and execution time.

In an embodiment of the present disclosure, the plurality of temporal and spatial features comprises thinktime, blocksize, randomness in access patterns associated with the source system, and I/O performed per second (Iops).

In an embodiment of the present disclosure, the one or more pre-defined parameters comprise ioengine, buffered, fsync, time_based, runtime, filesize, and filename.

In an embodiment of the present disclosure, the feature extraction engine is further configured to: identify unique file descriptors (FDs) in the captured I/O trace files; generate at least one of a read trace file and a write trace file for each of the unique FDs; and selectively extract the plurality of temporal and spatial features from the at least one read trace file and the at least one write trace file.

In an embodiment of the present disclosure, the workload generator is further configured to generate representative workloads by creating synthetic benchmark jobs for the at least one read trace file and the at least one write trace file.

In an embodiment of the present disclosure, the replay model is further configured to replay the extracted plurality of temporal and spatial features on the target system using a synthetic benchmark.

In an embodiment of the present disclosure, the extrapolator is further configured to extrapolate the plurality of temporal and spatial features based on a statistical method.

In an embodiment of the present disclosure, the statistical method used is one of a plurality of statistical methods that provides largest coefficient of determination ($R^2$) value.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which:

FIG. 8A and FIG. 8B provide an illustrative comparison of Solid State Drive (SSD) utilization by JPetStore™ and TPC-C™ (Transaction Processing Performance Council-C) respectively versus flexible I/O (FIO) tester synthetic benchmark replaying synthetic benchmark jobs, in accordance with an embodiment of the present disclosure, with time.

Figure 1:
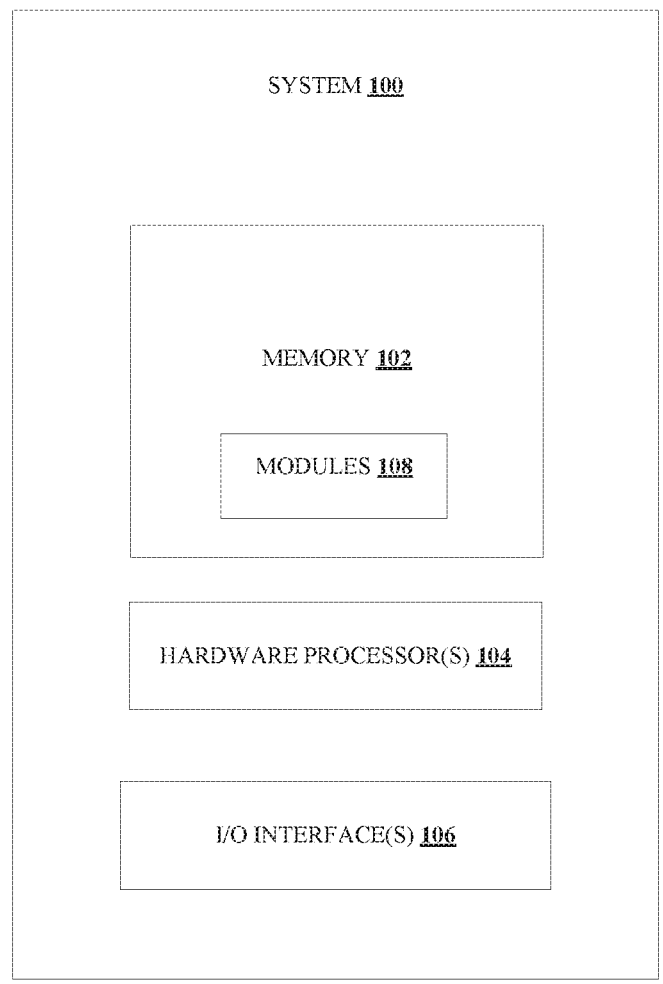
FIG. 1 illustrates an exemplary block diagram of a system for performance evaluation of Input/Output (I/O) intensive enterprise applications, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

When resource utilization or latency of an Input/Output (I/O) intensive application increases, enterprises need to migrate their data from a system using slow performing storage devices such as low-end hard disk drives (HDDs) with fewer cores to a system with low latency devices like high-end HDDs or Solid State Drives (SSDs) and more number of cores. SSDs offer dual advantage of better performance and energy efficiency. In order to avert challenges in studying the performance of an application with multiple types of storage devices and varying number of cores, I/O trace replay is generally used to reproduce the application characteristics on the target system without deploying the application on the target system. However, trace collection tools result in software overhead and also provide incorrect performance estimation at large concurrencies. Also, conventional performance predicting tools require an additional extrapolation tool for performance prediction at large concurrencies.

The present disclosure provides systems and methods that can enable system administrators to experiment easily with multiple systems with minimal efforts. I/O traces of the application of interest are captured at low concurrencies and performance affecting features are extracted. The extracted properties are fed to a synthetic benchmark and then played on a target system thereby accurately creating the same behavior of the application. Statistical methods are used to extrapolate these features to predict the performance at higher concurrency levels without generating traces at those concurrency levels. Performance is dependent on access pattern of the application and not on actual data. Accordingly, the method of the present disclosure recreates the same access pattern using only replica of database files of the same size as in an actual database, thereby averting need for deploying the application or database on the target system. Furthermore, the method of the present disclosure involves extrapolating the extracted performance affecting features of the traces which is a technical advance over the known method of extrapolating the traces since extrapolating traces for higher concurrencies is a complex process and it also results in very large files that need to be migrated to the target system for replay. The present disclosure uses storage device utilization as a performance metric to study trace emulation and extrapolation accuracy.

Referring now to the drawings, and more particularly to FIGS. 1 through 8, where similar reference characters denote corresponding features consistently throughout the figures, there are shown preferred embodiments and these embodiments are described in the context of the following exemplary system and method.

FIG. 1 illustrates an exemplary block diagram of a system 100 for performance evaluation of Input/Output (I/O) intensive enterprise applications, in accordance with an embodiment of the present disclosure. In an embodiment, the system 100 includes one or more processors 104, communication interface device(s) or input/output (I/O) interface(s) 106, and one or more internal data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions.

Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 108 (refer FIG. 2 modules 202 through 210) of the system 100 can be stored in the memory 102.

Figure 2:
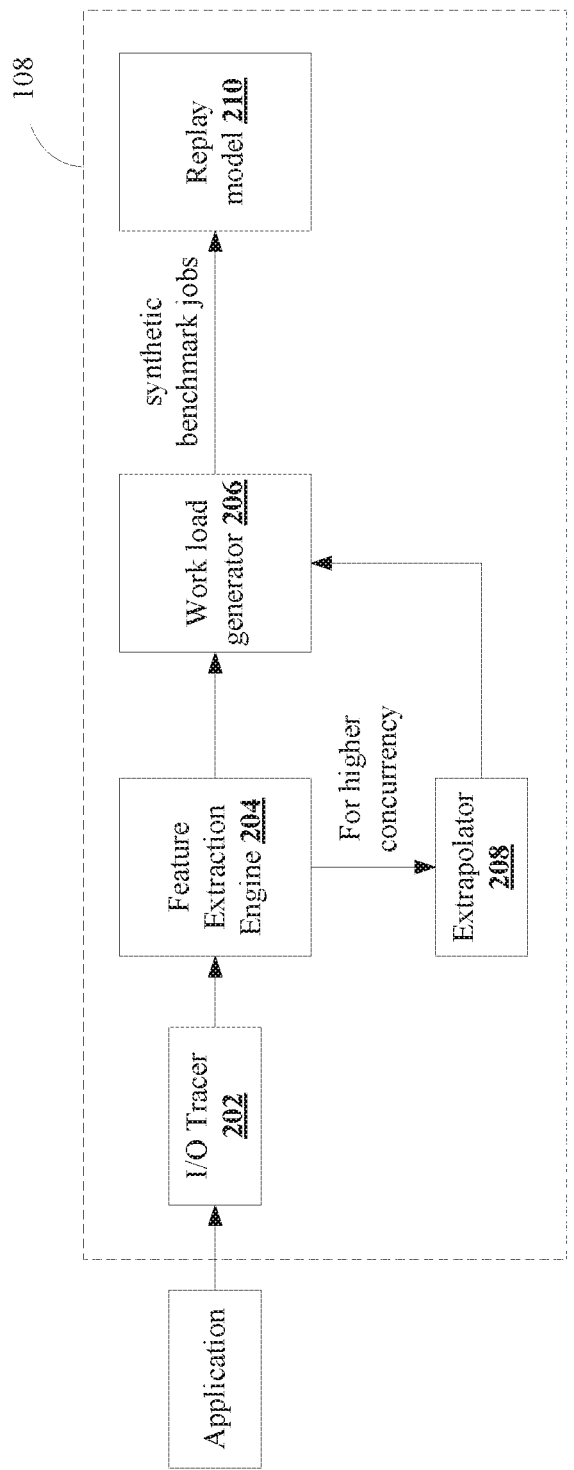
FIG. 2 illustrates exemplary functional modules of the system of FIG. 1 and interactions therebetween in accordance with an embodiment of the present disclosure.
Figure 3:
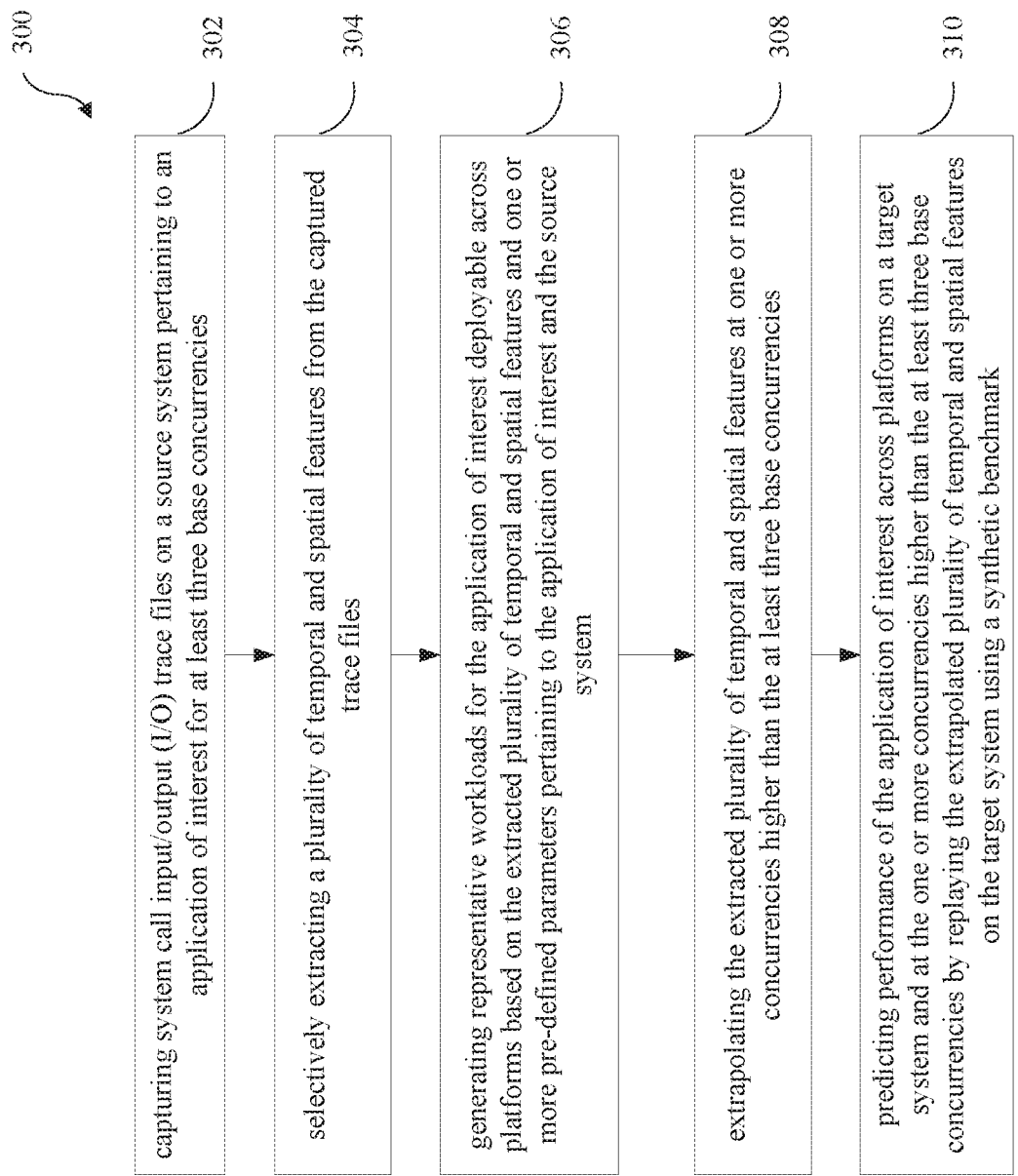
FIG. 3 is an exemplary flow diagram illustrating a computer implemented method for performance evaluation of Input/Output (I/O) intensive enterprise applications, in accordance with an embodiment of the present disclosure.

FIG. 2 illustrates exemplary functional modules (202 through 210) of the system 100 of FIG. 1 and interactions therebetween in accordance with an embodiment of the present disclosure and FIG. 3 is an exemplary flow diagram illustrating a computer implemented method 300 for performance evaluation of Input/Output (I/O) intensive enterprise applications, in accordance with an embodiment of the present disclosure. In an embodiment, the system 100 comprises one or more data storage devices or memory 102 operatively coupled to the one or more processors 104 and is configured to store instructions configured for execution of steps of the method 300 by the one or more processors 104.

The steps of the method 300 illustrated in FIG. 3 will now be explained in detail with reference to the components of system 100 of FIG. 1 and the exemplary functional modules depicted in FIG. 2. The method 300 requires running an application of interest (workload) at different levels of concurrencies and recording I/O traces at system call level on a source system. The present disclosure pertains to I/O intensive enterprise applications. Accordingly, the source system and target systems referred herein after may be interchangeably referred as database or storage device. In an embodiment, at step 302, an I/O trace collector 202 is configured to capture system call I/O trace files on the source system for at least three base concurrencies. The I/O trace collector may be any tool known in the art such as Strace™ or blktrace™. In an embodiment, the I/O trace collector used was Strace™. To capture the traces at the source system, all threads spawned by MySQL™ are tracked and then Strace™ is deployed to each of the threads. The Strace™ tool induces some overhead which increases with increase in workload. This is due to the fact that Strace™ pauses the application twice for each system call i.e. when system call begins and when system call stops. In accordance with the method 300, only I/O related system calls are captured. This in-turn mitigates the Strace™ overhead and size of the trace file as well. Furthermore, trace files are captured at low concurrencies only and extrapolated subsequently for higher concurrencies. The I/O calls captured are read( ), write( ), pread( ), pwrite( ), lseek( ), fsync( ), open( ), close( ). In an embodiment, the I/O trace files contain one or more of system calls with thread identifier, timestamp value, size of data read or written, offset address, file descriptor (FD), bytes returned, offset address, and execution time.

Figure 4:
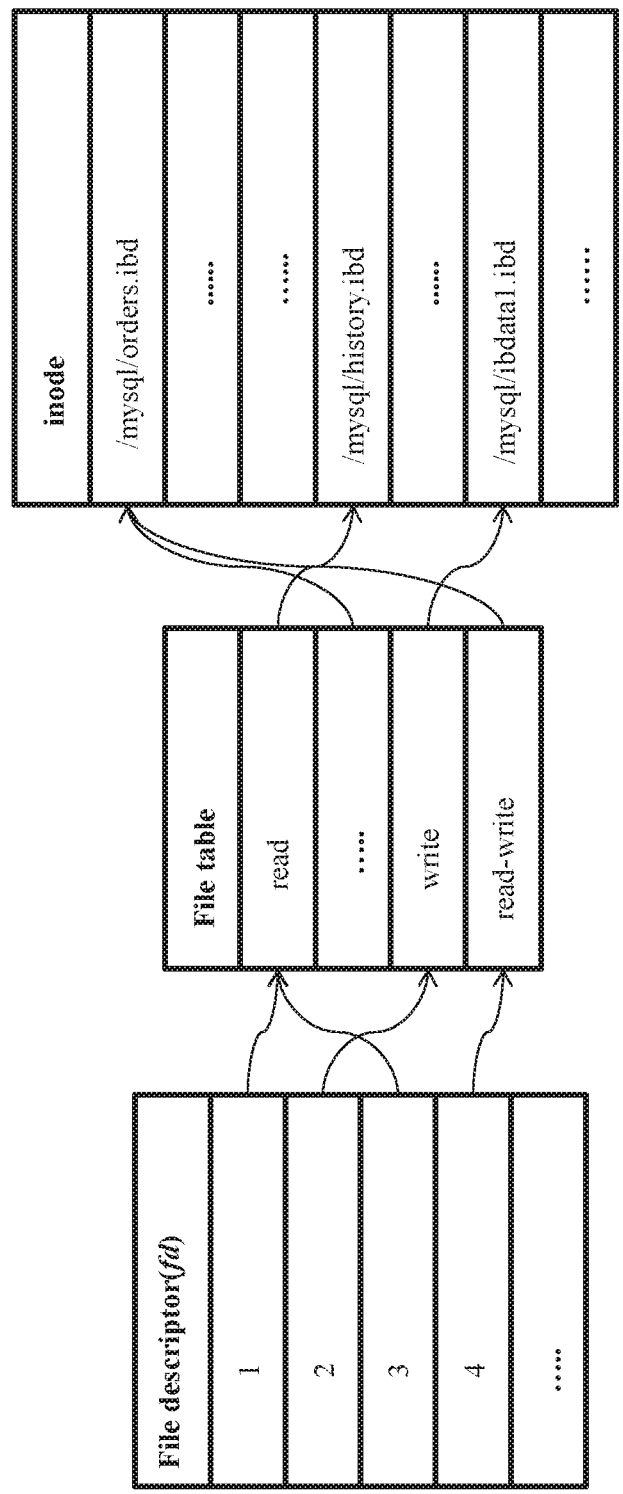
FIG. 4 provides a schematic representation of interplay between file descriptors, file table and inode as known in the art.
Figure 5:
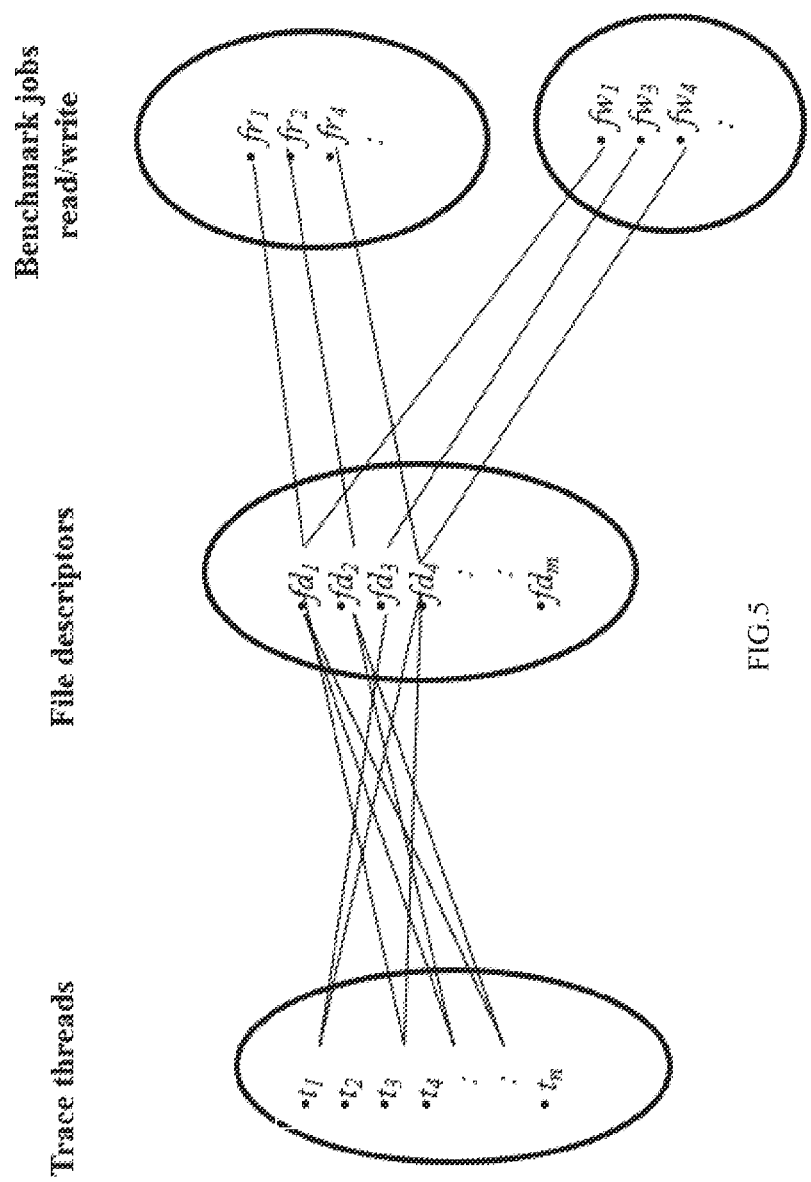
FIG. 5 provides a schematic representation of mapping between trace threads, file descriptors and Flexible Input/Output (FIO) jobs.

In an embodiment, at step 304, a feature extraction engine 204 is configured to selectively extract a plurality of temporal and spatial features from the captured trace files. The method 300 addresses the challenge of selecting important features that represent the temporal and spatial characteristics of an application and then judiciously extracting from the trace files such that they can be replayed on the target system. FIG. 4 provides a schematic representation of interplay between file descriptors, file table and inode as known in the art. It is observed that that there is a n:m relationship between threads and database files i.e. a thread can access multiple files in the database and multiple threads can access same file as well as illustrated. This type of relationship offers some challenges while defining and replaying each thread with a corresponding job in a synthetic benchmark. A thread may access some database files during its life span and these access operations (Read/Write) are interleaved. In a worst case scenario, a thread a may access all m files in the database. Hence for an application running n threads, n*m jobs may be required for replaying by the synthetic benchmark. These interleaved operations are difficult to recreate with synthetic benchmarks and result in large overhead. The method 300 of the present disclosure overcomes this limitation by grouping the threads in the trace files based on file descriptor (FD) they work upon in their life span. For each FD two trace files are created, one containing threads performing read I/O operations and other containing threads performing write I/O operations on that FD. All features are extracted from read and write files of each FD. There are two jobs created (read and write) for each FD representing all features corresponding to that FD. Since all database files may not be opened in Read-Write mode i.e. some may be read only and others may be write only, total number of jobs created for replaying by the synthetic benchmark is equal to or less than twice the number of unique FDs. FIG. 5 provides a schematic representation of mapping between trace threads, file descriptors and jobs (read/write) to be used by the synthetic benchmark.

Accordingly, in an embodiment, the step 304 of selectively extracting a plurality of temporal and spatial features comprises firstly identifying unique FDs in the captured I/O trace files. Then at least one of a read trace file and a write trace file are generated for each of the unique FDs. Subsequently, the plurality of temporal and spatial features are selectively extracted from the at least one read trace file and the at least one write trace file.

In an embodiment, the plurality of temporal and spatial features that may be selectively extracted are features that represent the application characteristics and also affect the performance significantly. Thinktime refers to the time duration for which a job is stalled after an I/O operation has completed and before the next I/O operation is issued. The thinktime between the I/O operations also affects the utilization of the storage device and is considered an important workload feature. Blocksize refers to the distribution of memory chunk sizes to issue I/O operations. The performance of a storage device is significantly affected by the retrieval and the storage patterns. The sequential read and write operations are performed faster as compared to random read and write operations. Randomness of access patterns again affects performance of an application and relates to how data is retrieved from the storage device by the application. Again, total number of I/O (read and write)

operations performed per second (Iops) affects performance of an application. Accordingly, in an embodiment, the plurality of temporal and spatial features that may be selectively extracted include thinktime, blocksize, randomness in access patterns associated with the source system, and I/O performed per second (Iops).

In an embodiment, at step 306, a workload generator 206 is configured to generate representative workloads for the application of interest based on the extracted plurality of temporal and spatial features and one or more pre-defined parameters pertaining to the application of interest and the source system. These representative workloads may be deployed across platforms. In an embodiment, the one or more pre-defined parameters may include ioengine, buffered, fsync, time_based, runtime, filesize, and filename. The parameter ioengine defines how I/O is delivered to the kernel. This parameter is particularly helpful when studying performance across operating systems. The parameter buffered may be set for buffered I/O. The parameter fsync may be set to sync dirty data when writing to a file. Its value defines after how many writes data sync should be performed. The parameter time_based refers to time based criterion for a synthetic benchmark run. The parameter runtime refers to duration of a job run. The parameter filesize refers to file size for each job to perform read and write operations. In the instant disclosure, the filesize refers to size of database files. The parameter filename refers to name of the database file.

The extracted features in the step 304 may be directly translated into a job for the synthetic benchmark if needed, to study the performance of the application on the target system for the same concurrency as the source system. Accordingly, in an embodiment, at step 306, synthetic benchmark jobs are created for the at least one read trace file and the at least one write trace file.

The method 300 of the present disclosure also facilitates predicting the performance of the application at higher concurrencies on the target system. Each feature might exhibit a different scaling behavior. Some features scale linearly as the workload or concurrency increases while others may scale differently (e.g. power or logarithmic). In an embodiment, at step 308, an extrapolator 208 may be configured to extrapolate the extracted plurality of temporal and spatial features at one or more concurrencies higher than the at least three base concurrencies. A statistical method may be used for extrapolating the plurality of temporal and spatial features. In an embodiment, four canonical methods, namely linear, logarithmic, power and exponential were used. In order to decide the right statistical method for extrapolation of each feature for each FD, the trace files captured at the three base concurrencies and the extracted features are tested with all four statistical methods and the method that has largest coefficient of determination ($R^2$) value is treated as the right method for extrapolation.

Table 1 below shows extrapolation of one application feature —I/O performed per second (iops). Using trace files captured for application TPC-C™ (Transaction Processing Performance Council-C) at base concurrencies (no. of users) 10, 15, 20, the read iops for 200 users are extrapolated for each FD.

TABLE 1

Extrapolation of TPC-C ™ (Transaction Processing Performance Council-C) feature I/O performed per second (iops) for each File descriptor (FD)

| No. of users | iops (read/second) | | | | | | | |
|---|---|---|---|---|---|---|---|---|
| | customer.ibd (fd1) | orders.ibd (fd2) | stock.ibd (fd3) | order_line.ibd (fd4) | ibdata1.ibd (fd5) | ib_logfile0 (fd6) | . . . | 10.ibd |
| 10 | 1.67 | 2.2 | 8.1 | 2.6 | 1.7 | 2 | | 1.8 |
| 15 | 2.5 | 3.1 | 12.14 | 3.3 | 1.6 | 3.5 | | 2.5 |
| 20 | 3.2 | 4.1 | 16 | 4.7 | 2.2 | 5.4 | | 3.3 |
| . . . | . . . | . . . | . . . | . . . | . . . | . . . | . . . | . . . |
| 200 (extrapolated) | 28.25 (linear) | 31.9 (linear) | 154 (power) | 30.9 (power) | 4.4 (linear) | 64.7 (power) | . . . | 24.23 power |

Likewise, write iops for each FD may also be extrapolated. The other spatial and temporal features listed herein above may also be extrapolated from both read and write trace files for desired concurrencies.

The plurality of spatial and temporal features extracted and extrapolated are then translated into jobs for a synthetic benchmark. The synthetic benchmark job is prepared by defining the one or more pre-defined parameters pertaining to the application of interest and the source system and the plurality of spatial and temporal features explained herein above for each FD. The synthetic benchmark job may be migrated to any storage system where the synthetic benchmark is installed.

In an embodiment, at step 310, a replay model 210 is configured to predict performance of the application of interest across platforms on the target system and at the one or more concurrencies higher than the at least three base concurrencies by replaying the extrapolated plurality of temporal and spatial features on the target system using a synthetic benchmark.

Experimental Setup

The system and method of the present disclosure has been validated using TPC-C™ benchmark and a web based application JPetStore™. TPC-C™ is an I/O intensive benchmark for comparing online transaction processing (OLTP) performance on various software and hardware configurations. TPC-C™ has a complex database and consists of five concurrent complex instructions. JPetStore™ is an eCommerce J2EE™ application benchmark which emulates an online pet store. It allows users to browse and search for different types of pets in five different categories. For replaying the application characteristics on the target systems, flexible I/O (FIO) tester synthetic benchmark has been used considering the extent of flexibility it provides for detailed workload setup. In the experimental setup, TPCC™ was executed from command prompt and JPetStore™ was deployed on apache tomcat server. MySQL™ was used as a backend for both the benchmarks. All the measurements were taken in steady state of the application. The storage systems used in this study were HDD and SSD with configurations as shown in Table 2.

TABLE 2

Storage systems used in the experimental study

| Storage type | Disk Model | RPM | No. of Disks | I/O Scheduler | File System | Interface | System Configuration | Linux Kernel |
|---|---|---|---|---|---|---|---|---|
| High-end HDD | HP | 10000 | 1 | CGQ | ext4 | Dual Port, SAS 6 GB/s | 16 Core Xeon CPU @2.4 GHz, 12 MB, L2 cache | CentOS 6.6, 2.6, 32 |
| SSD | Virident Systems Inc. Virident Systems | — | 1PCIe | Default | ext3 | | 16 Core Xeon CPU @2.4 GHz, 12 MB, L2 cache | CentOS 6.6, 2.6, 32 |

I/O traces of the applications were captured on the database server using Strace™ utility. Traces were captured at multiple base concurrency levels. High-end HDD was used as a source system device while SSD was used as a target system.

Figure 6A:
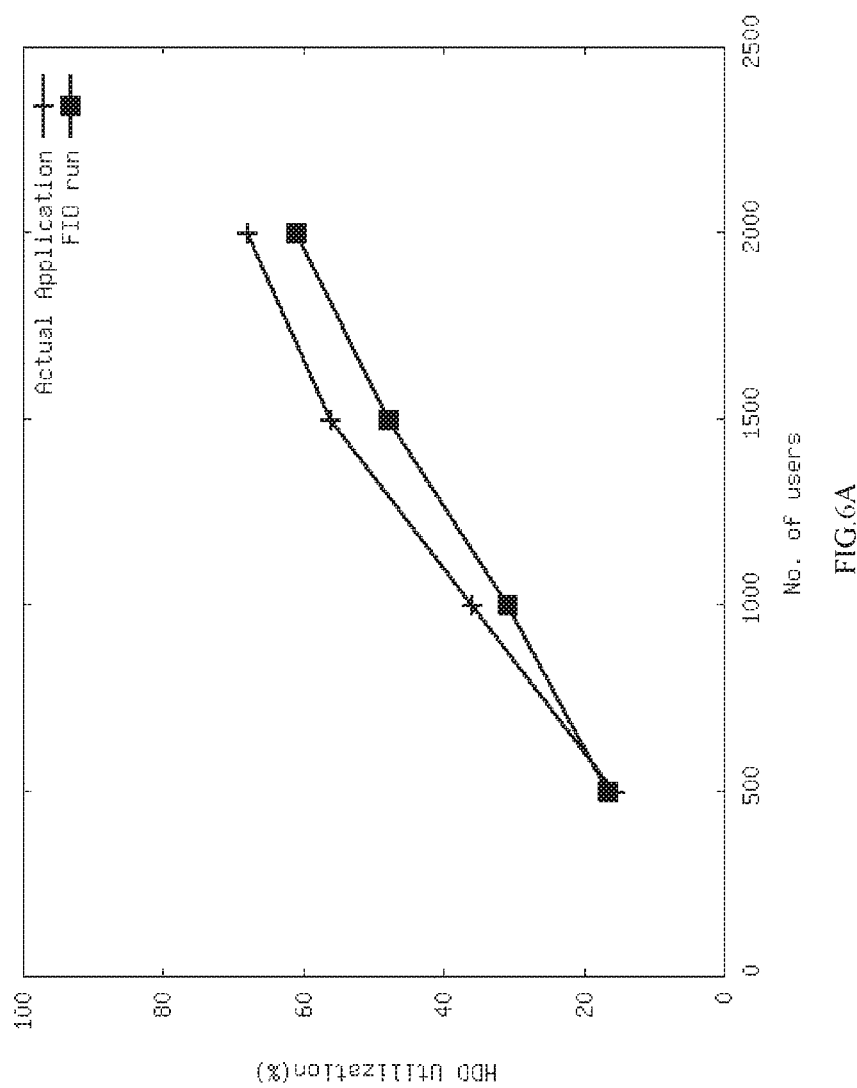
FIG. 6A and FIG. 6B provide an illustrative comparison of hard disk drive (HDD) utilization by JPetStore™ and TPC-C™ (Transaction Processing Performance Council-C) respectively versus flexible I/O (FIO) tester synthetic benchmark replaying synthetic benchmark jobs generated in accordance with an embodiment of the present disclosure.
Figure 6B:
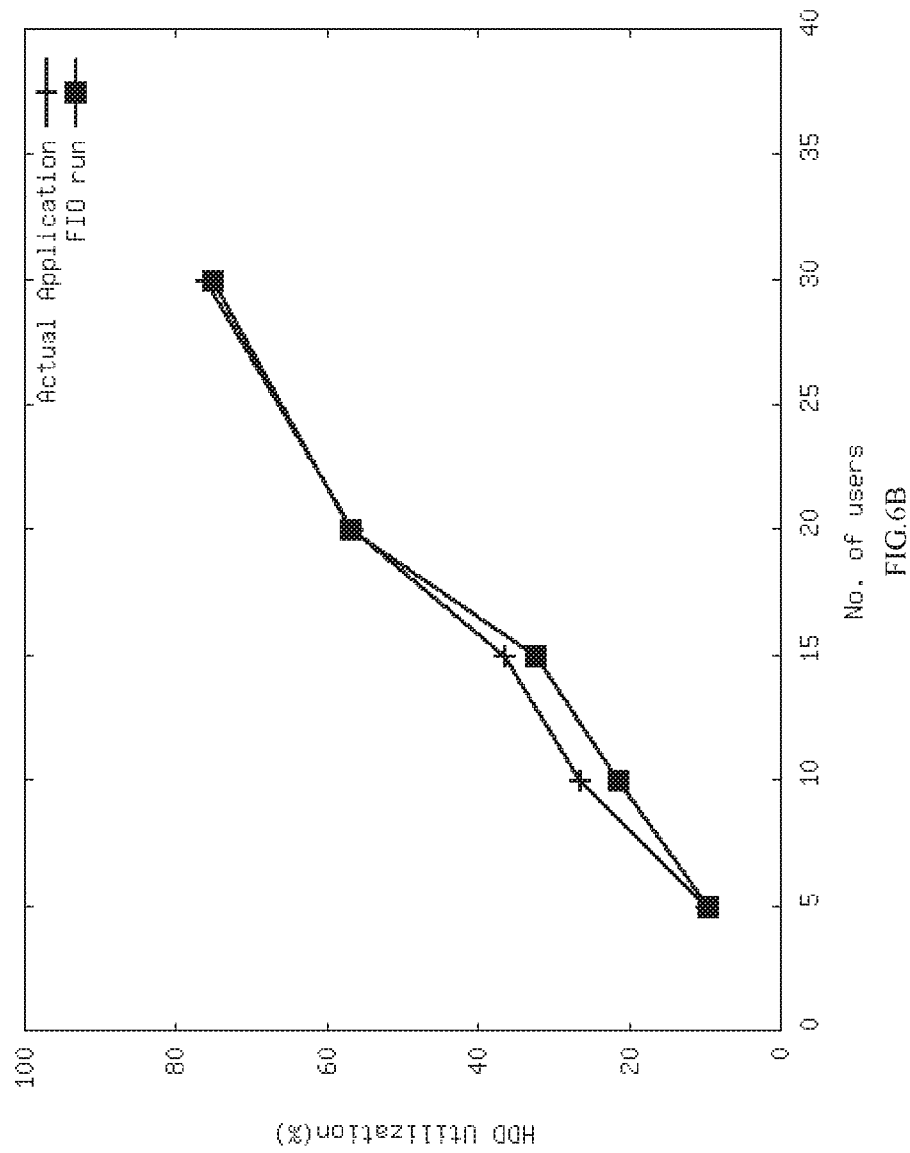

Tests were performed to validate the method of the present disclosure for replicating the application behavior using synthetic benchmark and also extrapolating the features for higher concurrency levels. To validate generating of representative workloads for I/O intensive applications, the application features were extracted on HDD, the features were mapped to a FIO job and replayed using FIO synthetic benchmark on the same storage system again. TPC-C™ was run at multiple concurrency levels of 5, 10, 15, 20 and 30. Trace files were captured for all these concurrencies. Disk utilization was recorded for each of these concurrencies when Strace™ was not running. These trace files were fed to the feature extraction engine. The output of the feature extraction engine is a job for the FIO. The FIO replays the job for each the trace files and records disk utilization. Results were compared for application TPC-C™. FIG. 6B provides an illustrative comparison of hard disk drive (HDD) utilization by TPC-C™ (Transaction Processing Performance Council-C) versus flexible I/O (FIO) tester synthetic benchmark replaying synthetic benchmark jobs. As shown in FIG. 6B, the FIO run results in the same resource utilization as the actual application TPC-C™ run. Similar behavior was seen with application JPetStore™ as well. Trace files were collected for 500, 1000, 1500 and 2000 users. After feature extraction, FIO job was created and replayed for same duration. FIG. 6A provides an illustrative comparison of hard disk drive (HDD) utilization by JPetStore™ versus flexible I/O (FIO) tester synthetic benchmark replaying synthetic benchmark jobs. A larger gap in device utilization at higher concurrency i.e. 1500 and 2000 was noted. This may be attributed to the Strace™ overhead.

Again, the experimental setup was used to validate performance prediction at higher concurrencies as well. The applications were run on HDD first and the extracted features were replayed using FIO on SSD. Traces collected on HDD for at least three base concurrencies were extrapolated in accordance with the present disclosure for higher concurrency levels. The extrapolated features were then run with FIO and device utilization was observed for comparison with actual application run at those concurrencies.

Figure 7A:
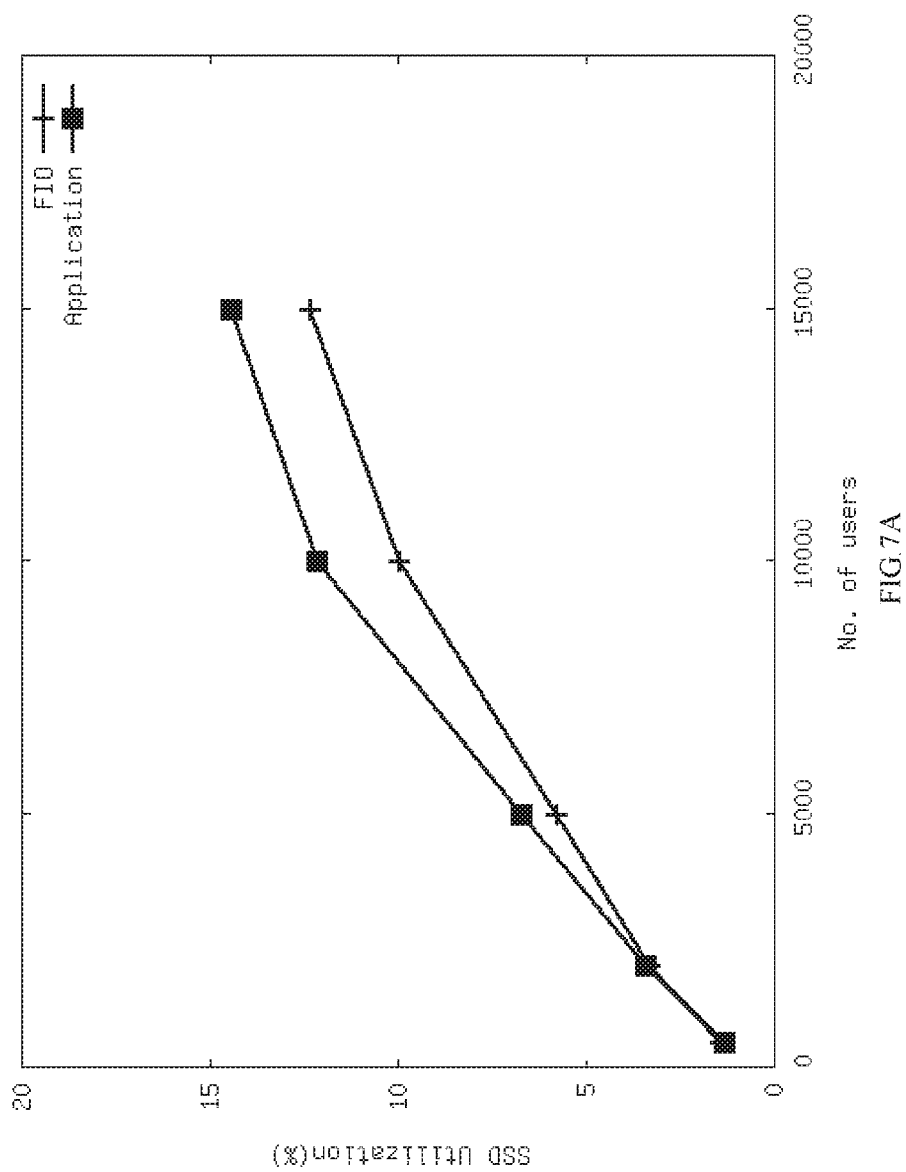
FIG. 7A and FIG. 7B provide an illustrative comparison of Solid State Drive (SSD) utilization by JPetStore™ and TPC-C™ (Transaction Processing Performance Council-C) respectively versus flexible I/O (FIO) tester synthetic benchmark replaying synthetic benchmark jobs generated in accordance with an embodiment of the present disclosure.
Figure 7B:
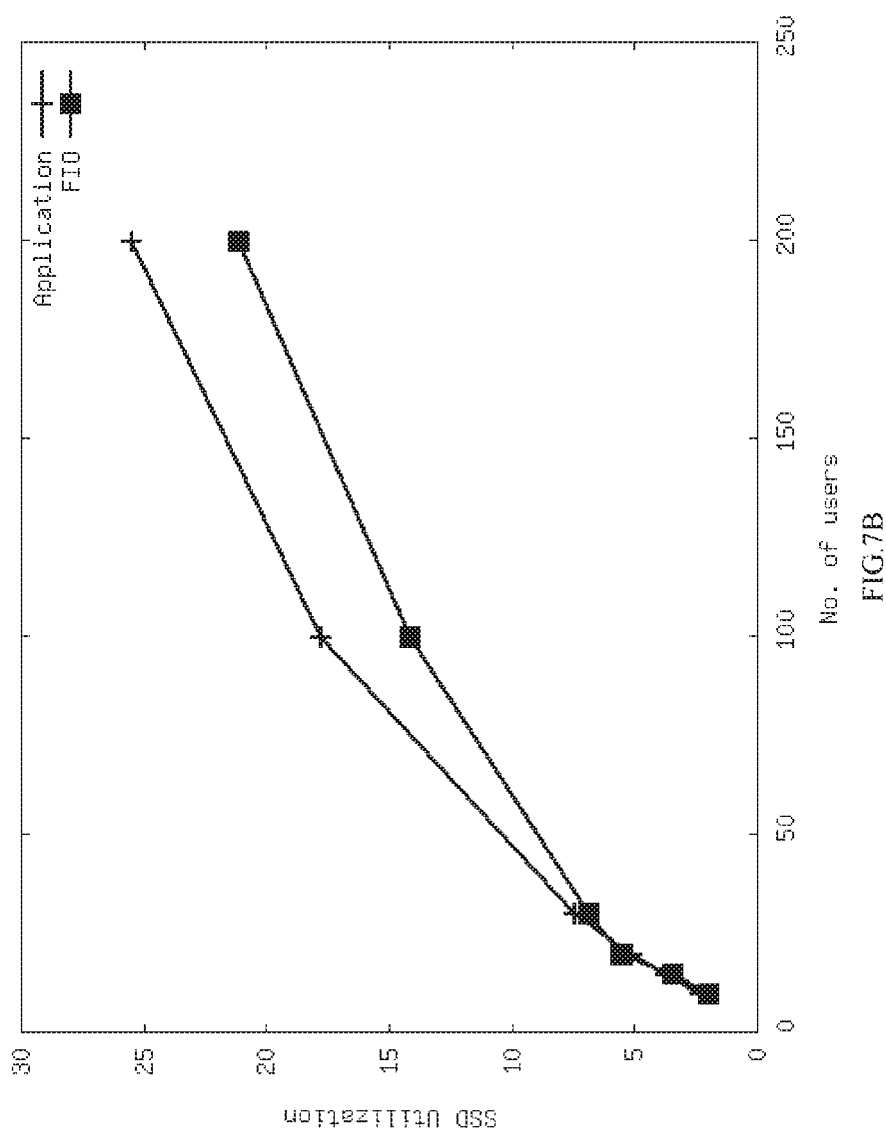

Traces of TPC-C™ application for three concurrencies 10, 15 and 20 were captured, features were extracted and extrapolated for concurrencies 30, 100 and 200 and run with FIO. FIG. 7B provides an illustrative comparison of Solid State Drive (SSD) utilization by TPC-C™ (Transaction Processing Performance Council-C) versus flexible I/O (FIO) tester synthetic benchmark replaying synthetic benchmark jobs. As shown in the FIG. 7B, for concurrencies 10, 15, 20 (no extrapolation) on SSD same resource utilization by FIO and actual application was noted. For extrapolated values i.e. beyond 20 users, there was some deviation from the actual resource utilization but within 20% error bound. For JPetStore™ application I/O traces were collected for 1000, 1500 and 2000 users at HDD. Again features were extrapolated for higher concurrencies 5000, 10000 and 15000 users. These features were replayed with FIO on SSD. FIG. 7A provides an illustrative comparison of Solid State Drive (SSD) utilization by JPetStore™ versus flexible I/O (FIO) tester synthetic benchmark replaying synthetic benchmark jobs. Again, for concurrencies levels at which traces were recorded on HDD and replayed on FIO, device utilization difference between actual application run and corresponding FIO run is noted to be negligible. FIG. 8A and FIG. 8B provide an illustrative comparison of Solid State Drive (SSD) utilization by JPetStore™ and TPC-C™ (Transaction Processing Performance Council-C) respectively versus flexible I/O (FIO) tester synthetic benchmark replaying synthetic benchmark jobs, in accordance with an embodiment of the present disclosure, with time.

Thus methods and systems of the present disclosure facilitate performance testing of an I/O intensive application on multiple storage systems without actually deploying the application. Also, the resource utilization can be predicted on the target system at concurrencies higher than that currently achieved on the source system. Using synthetic benchmark, the workload of applications may be successfully replayed using features extracted when run on the source system. Again, the extracted features may be extrapolated for predicting the performance at higher concurrencies on a target system. It is assumed that there are no software bottlenecks in the application. It is also assumed that for a given concurrency level, standard deviation in the resource utilization due to workload is small.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (300) comprising:
capturing system call input/output (I/O) trace files on a source system pertaining to an application of interest for at least three base concurrencies (302);
selectively extracting a plurality of temporal and spatial features from the captured trace files (304) by:
identifying unique file descriptors (FDs) in the captured I/O trace files;
generating at least one of a read trace file and a write trace file for each of the unique FDs; and
selectively extracting the plurality of temporal and spatial features from the at least one read trace file and the at least one write trace file,
wherein the plurality of temporal and spatial features comprises thinktime, blocksize, randomness in access patterns associated with the source system, and I/O performed per second (Iops);
generating representative workloads for the application of interest deployable across platforms based on the extracted plurality of temporal and spatial features and one or more pre-defined parameters pertaining to the application of interest and the source system (306), wherein the one or more pre-defined parameters comprise ioengine, buffered, fsync, time based, runtime, filesize, and filename;
extrapolating the extracted plurality of temporal and spatial features at one or more concurrencies higher than the at least three base concurrencies (308), wherein the plurality of temporal and spatial features are extrapolated based on a statistical method, and wherein the statistical method used is one of a plurality of statistical methods that provides largest coefficient of determination (R2) value; and
predicting performance of the application of interest across platforms on a target system and at the one or more concurrencies higher than the at least three base concurrencies by replaying the extrapolated plurality of temporal and spatial features on the target system using a synthetic benchmark (310).

2. The processor implemented method of claim 1, wherein the I/O trace files contain one or more of system calls with thread identifier, timestamp value, size of data read or written, offset address, file descriptor (FD), bytes returned, offset address, and execution time.

3. The processor implemented method of claim 1, wherein generating representative workloads comprises creating synthetic benchmark jobs for the at least one read trace file and the at least one write trace file.

4. The processor implemented method of claim 3, further comprising replaying the extracted plurality of temporal and spatial features on the target system using a synthetic benchmark.

5. The processor implemented method of claim 1, wherein extrapolating the plurality of temporal and spatial features based on a statistical method.

6. The processor implemented method of claim 5, wherein the statistical method used is one of a plurality of statistical methods that provides largest coefficient of determination ($R^2$) value.

7. A system (100) comprising:
one or more processors (104); and
one or more internal data storage devices (102) operatively coupled to the one or more processors (104) for storing instructions configured for execution by the one or more processors (104), the instructions being comprised in:
an I/O trace collector (202) configured to capture system call input/output (I/O) trace files on a source system pertaining to an application of interest for at least three base concurrencies;
a feature extraction engine (204) configured to selectively extract a plurality of temporal and spatial features from the captured trace files, the plurality of temporal and spatial features comprising thinktime, blocksize, randomness in access patterns associated with the source system, and I/O performed per second (lops), wherein the feature extraction engine (204) selectively extracts the plurality of termporal and spatial features by:
identifying unique file descriptors (FDs) in the captured I/O trace files;
generating at least one of a read trace file and a write trace file for each of the unique FDs; and
selectively extracting the plurality of temporal and spatial features from the at least one read trace file and the at least one write trace file;
a workload generator (206) configured to generate representative workloads for the application of interest deployable across platforms based on the extracted plurality of temporal and spatial features and one or more pre-defined parameters pertaining to the application of interest and the source system, the one or more pre-defined parameters comprising ioengine, buffered, fsync, time_based, runtime, filesize, and filename;
an extrapolator (208) configured to extrapolate the extracted plurality of temporal and spatial features at one or more concurrencies higher than the at least three base concurrencies, wherein the extrapolator (208) is further configured to extrapolate the plurality of temporal and spatial features based on a statistical method, and wherein the statistical method used is one of a plurality of statistical methods that provides largest coefficient of determination (R2) value; and
a replay model (210) configured to predict performance of the application of interest across platforms on a target system and at the one or more concurrencies higher than the at least three base concurrencies by replaying the extrapolated plurality of temporal and spatial features on the target system using a synthetic benchmark.

8. The system of claim 7, wherein the I/O trace files contain one or more of system calls with thread identifier, timestamp value, size of data read or written, file descriptor (FD), bytes returned, offset address, and execution time.

9. The system of claim 7, wherein the workload generator (206) is further configured to generate representative workloads by creating synthetic benchmark jobs for the at least one read trace file and the at least one write trace file.

10. The system of claim 9, wherein the replay model (210) is further configured to replay the extracted plurality of temporal and spatial features on the target system using a synthetic benchmark.

11. A computer program product comprising a non-transitory computer readable medium having a computer readable program embodied therein, wherein the computer readable program, when executed on a computing device, causes the computing device to:
capture system call input/output (I/O) trace files on a source system pertaining to an application of interest for at least three base concurrencies;
selectively extract a plurality of temporal and spatial features from the captured trace files by:
identifying unique file descriptors (FDs) in the captured I/O trace files;
generating at least one of a read trace file and a write trace file for each of the unique FDs; and
selectively extracting the plurality of temporal and spatial features from the at least one read trace file and the at least one write trace file,
wherein the plurality of temporal and spatial features comprises thinktime, blocksize, randomness in access patterns associated with the source system, and I/O performed per second (lops);
generate representative workloads for the application of interest deployable across platforms based on the extracted plurality of temporal and spatial features and one or more pre-defined parameters pertaining to the application of interest and the source system), wherein the one or more pre-defined parameters comprise ioengine, buffered, fsync, time based, runtime, filesize, and filename;
extrapolate the extracted plurality of temporal and spatial features at one or more concurrencies higher than the at least three base concurrencies) wherein the plurality of temporal and spatial features are extrapolated based on a statistical method, and wherein the statistical method used is one of a plurality of statistical methods that provides largest coefficient of determination (R2) value; and
predict performance of the application of interest across platforms on a target system and at the one or more concurrencies higher than the at least three base concurrencies by replaying the extrapolated plurality of temporal and spatial features on the target system using a synthetic benchmark.

* * * * *